US006633895B1

United States Patent
Bass et al.

(10) Patent No.: US 6,633,895 B1
(45) Date of Patent: Oct. 14, 2003

(54) APPARATUS AND METHOD FOR SHARING OVERFLOW/UNDERFLOW COMPARE HARDWARE IN A FLOATING-POINT MULTIPLY-ACCUMULATE (FMAC) OR FLOATING-POINT ADDER (FADD) UNIT

(75) Inventors: Stephen L Bass, Ft Collins, CO (US); Ravi G. Koshy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,861

(22) Filed: Feb. 22, 2000

(51) Int. Cl.⁷ .................................................. G06F 7/38
(52) U.S. Cl. ........................................................ 708/498
(58) Field of Search .................................. 708/498, 501, 708/552, 510, 505, 497, 316, 708; 712/221

(56) References Cited

U.S. PATENT DOCUMENTS

| | | | | |
|---|---|---|---|---|
| 3,725,649 A | * | 4/1973 | Deerfield ................ | 708/498 |
| 4,534,010 A | * | 8/1985 | Kobayashi et al. ...... | 708/501 |
| 4,773,035 A | * | 9/1988 | Lee et al. ................ | 708/501 |
| 4,779,220 A | * | 10/1988 | Nukiyama .............. | 708/510 |
| 5,038,313 A | * | 8/1991 | Kojima ................... | 708/552 |
| 5,161,119 A | * | 11/1992 | Chang et al. ............ | 708/708 |
| 5,235,533 A | * | 8/1993 | Sweedler ................ | 708/552 |
| 5,392,230 A | * | 2/1995 | Christopher ............. | 708/316 |
| 5,550,767 A | * | 8/1996 | Taborn et al. ........... | 708/552 |
| 6,012,077 A | * | 1/2000 | Tai ......................... | 712/221 |
| 6,108,772 A | * | 8/2000 | Sharangpani ........... | 708/497 |
| 6,219,685 B1 | * | 4/2001 | Story ...................... | 708/498 |
| 6,314,443 B1 | * | 11/2001 | Seal ........................ | 708/505 |

OTHER PUBLICATIONS

Chao, Floating–Point Division and Squareroot Circuit with Early Determination of Resultant Exponent, Sep. 4, 2001, United States Statutory Invention Registration No. U. S H1993H.*

* cited by examiner

*Primary Examiner*—Chuong Dinh Ngo
*Assistant Examiner*—Chat C. Do

(57) ABSTRACT

An apparatus and method provide for performing either an overflow or underflow comparison while minimizing overflow/underflow comparison circuitry. In particular, the apparatus and are implemented with overflow/underflow possible check circuitry that determines if a mathematical operation between a first exponent signal and a second exponent signal creates a potential overflow condition. The overflow/underflow possible check circuitry generates a signal indicating whether an overflow or underflow condition is a possibility. Exponent compare circuitry computes an actual overflow or underflow condition. The exponent compare circuitry computes an actual overflow condition if the signal, from the overflow/underflow possible check circuitry, indicates that overflow is possible, and computes an actual underflow condition if the signal, from the overflow/underflow possible check circuitry, does not indicate overflow is possible.

9 Claims, 13 Drawing Sheets

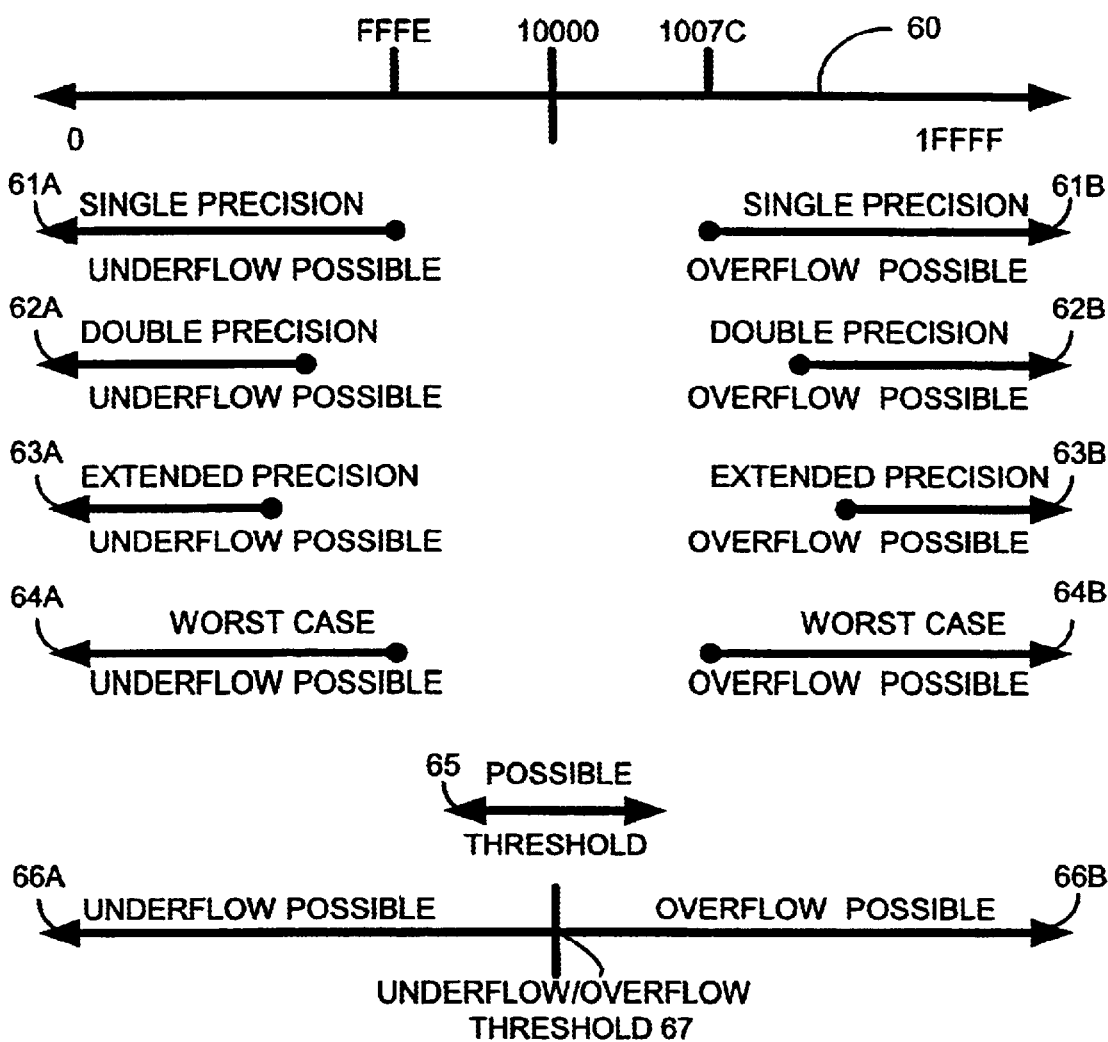

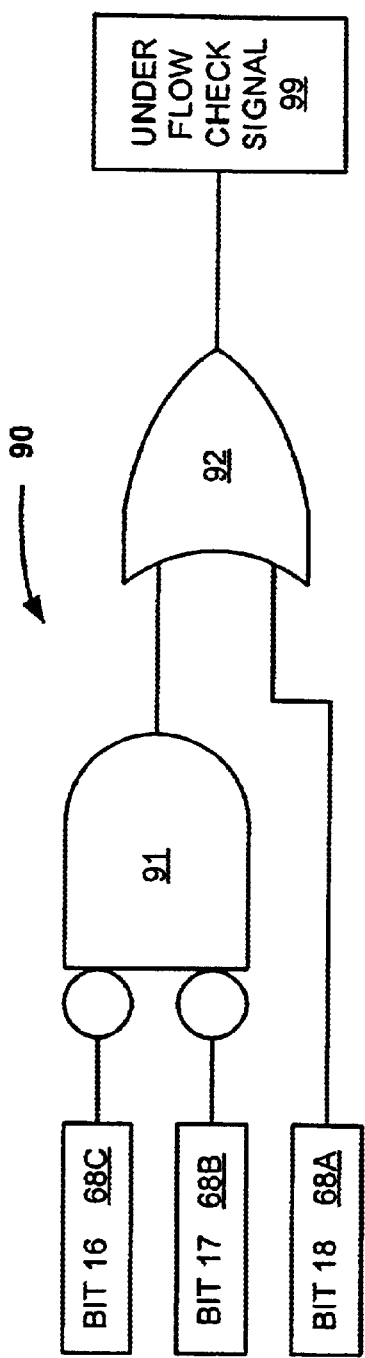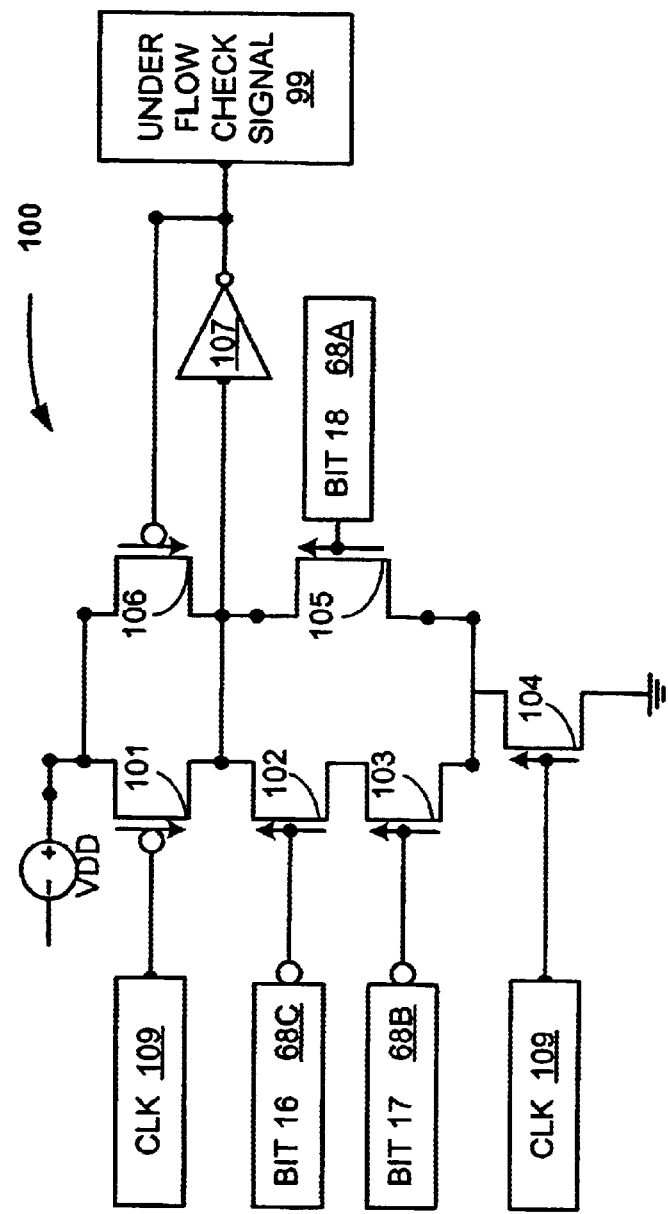
FIG. 5A
FIG. 5B

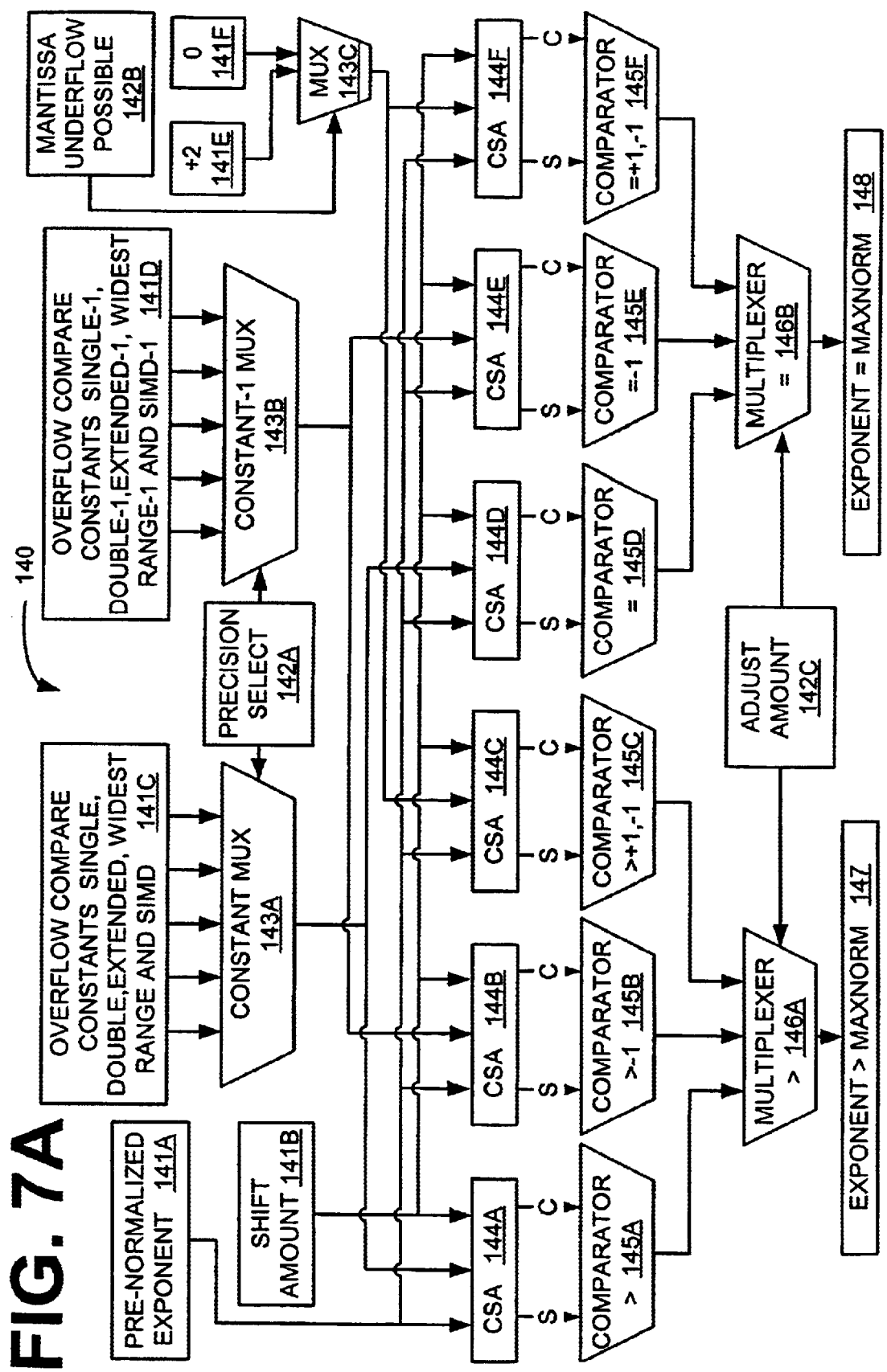

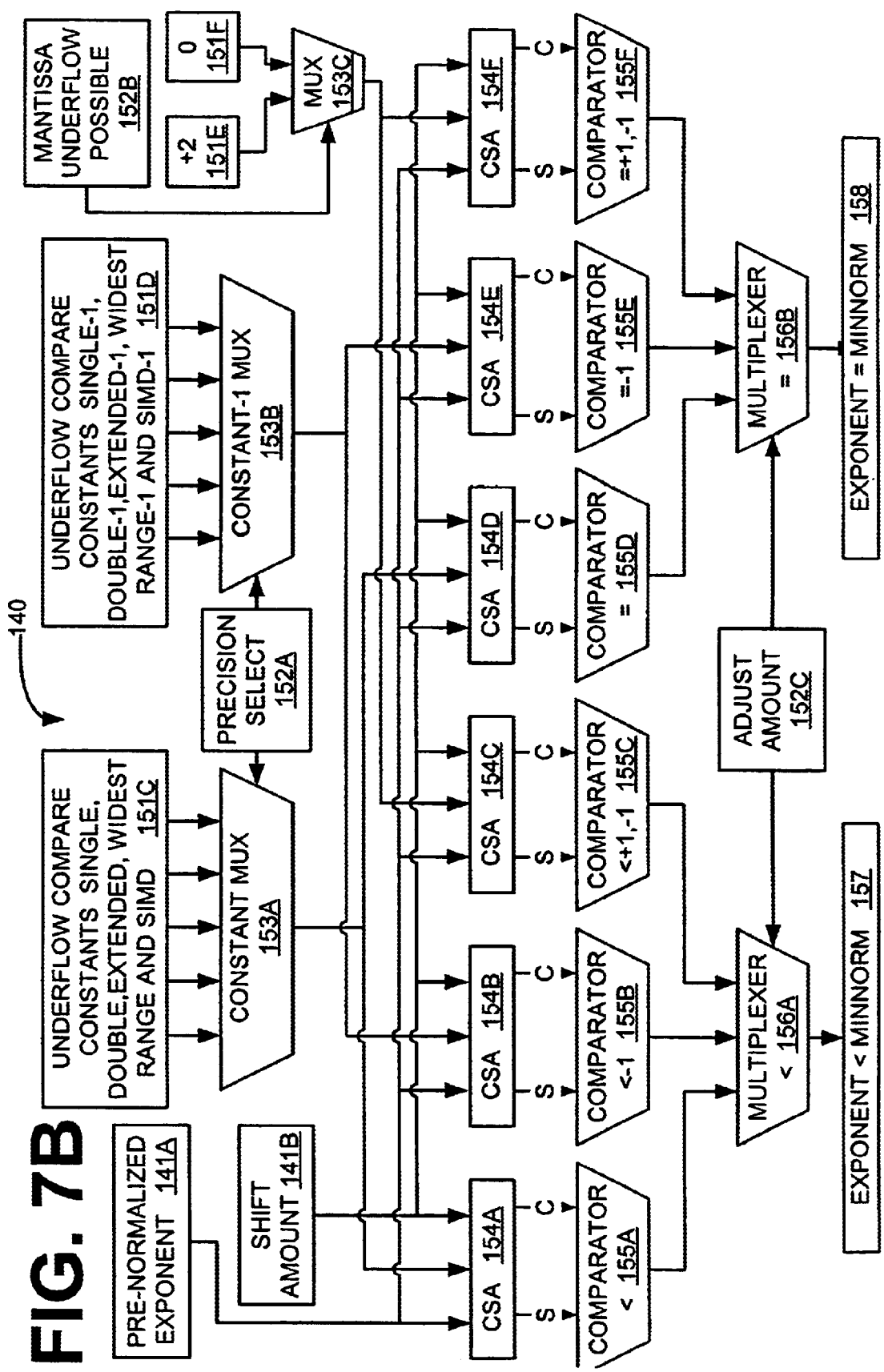

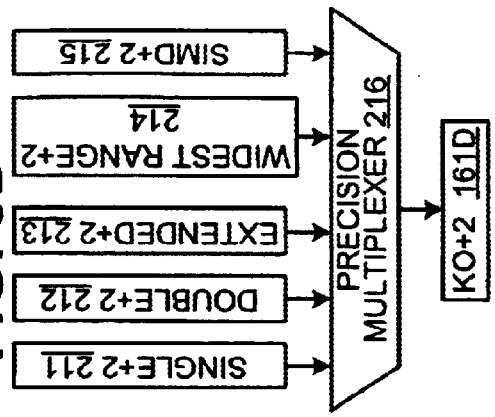
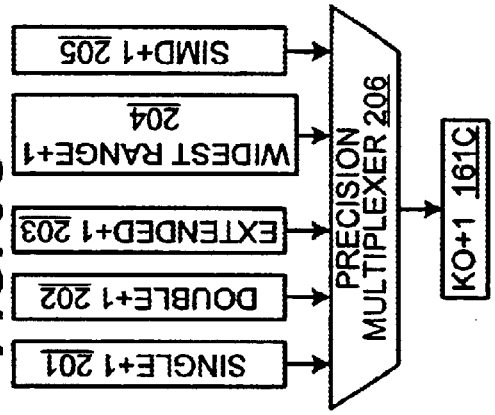
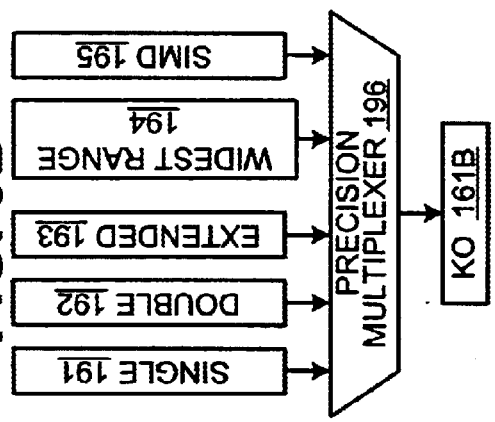
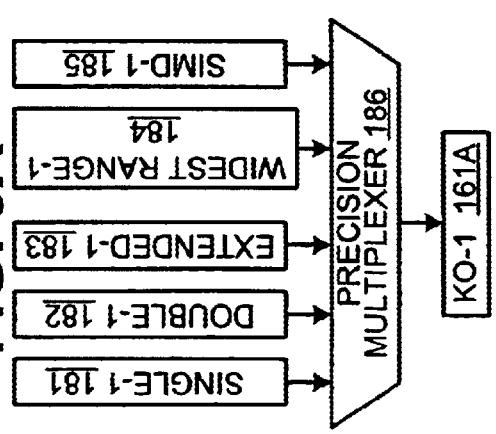
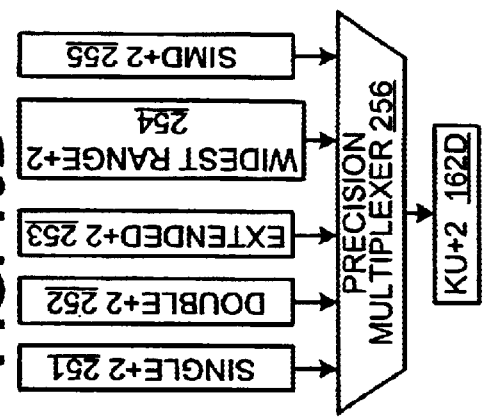
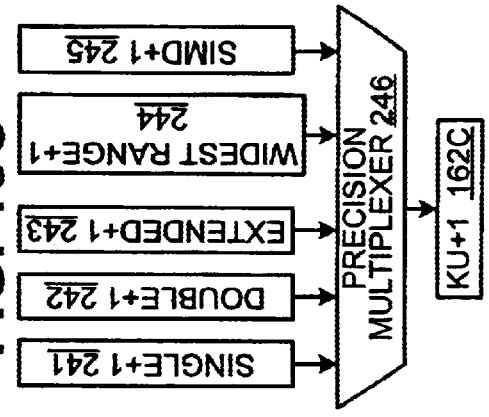
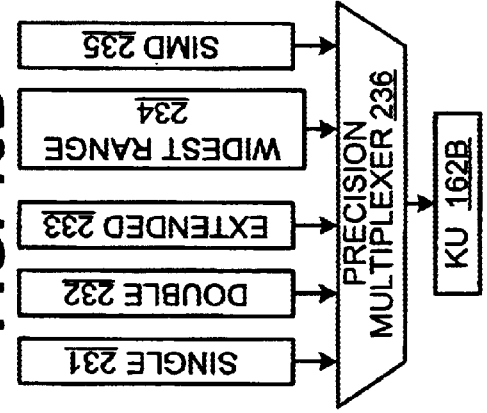
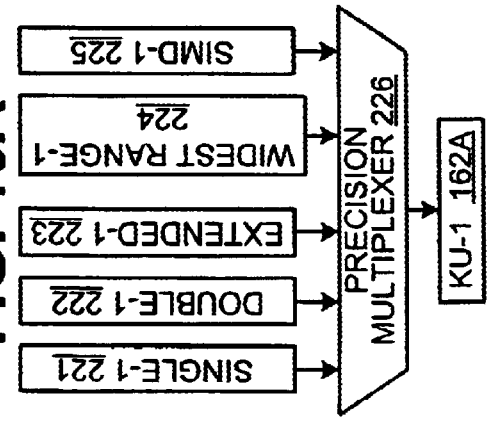

APPARATUS AND METHOD FOR SHARING OVERFLOW/UNDERFLOW COMPARE HARDWARE IN A FLOATING-POINT MULTIPLY-ACCUMULATE (FMAC) OR FLOATING-POINT ADDER (FADD) UNIT

BACKGROUND OF THE INVENTION

1. Technical Field

The present invention generally relates to arithmetic operations in computer processors, and more particularly, to sharing overflow/underflow compare hardware to reduce power and circuit size requirements.

2. Description of Related Art

Currently, the arithmetic operations performance of many present processor implementations is increased by utilizing a floating-point processor. These floating-point processors can include overflow/underflow hardware, to determine if the exponent of a computed result creates an underflow or overflow condition.

Illustrated in FIG. 1A, is a block diagram representing an example of a prior art independent overflow circuitry 11. The exponent signal 5 is loaded into comparators 13 (A–N). Also loaded into comparators 13 (A–N) are a set of constants K00–KON (12A–12N). These constants are architecture specific and related to the maximum exponent values. By comparing the exponent to these constant values, it is possible to determine if an overflow condition exists. The output of comparators 13 (A–N) is input into overflow logic 14.

Overflow logic 14 evaluates the output of comparators 13 (A–N) to determine whether or not the generation of an overflow signal is required. If the overflow logic 14 determines an overflow condition has occurred, the overflow logic 14 generates a high signal for the overflow signal 15. If overflow logic 14 determines that an overflow condition has not occurred, overflow logic 14 generates a low signal for the overflow signal 15.

Illustrated in FIG. 1B, is a block diagram representing an example of a prior art independent underflow circuitry 21. The exponent signal 5 is loaded into each comparator 23 (A–N). Also loaded into comparators 23 (A–N) are a set of constants KU0–KUN (22A–22N). These constants are architecture specific and related to the minimum exponent values. By comparing the exponent to these constant values, it is possible to determine if an underflow condition exists. The output of comparators 23 (A–N) is input into underflow logic 24.

Underflow logic 24 evaluates the output of comparators 23 (A–N), to determine whether or not the generation of an underflow signal is required. If the underflow logic 24 determines an underflow condition has occurred, the underflow logic 24 generates a high signal for the underflow signal 25. If underflow logic 24 determines that an underflow condition has not occurred, underflow logic 24 generates a low signal for the underflow signal 25.

A problem with the above described arrangement, is that the number of comparators used in the overflow/underflow circuitry increases dramatically with speculative compares. Speculative compares are used to compute many of the potential results absent some late arriving signals. The late arriving signals then select the correct operation results from the speculative compares. This further increases the size of the overflow/underflow comparison circuitry.

Another problem with the above described arrangement, is that some implementations may produce floating-point results of several different types of precision, requiring more comparisons to determine overflow/underflow conditions.

Illustrated in FIG. 2 is a block diagram representing an example of a prior art comparator circuitry 31. It is typical in floating point multiply-accumulate (FMAC) and in floating-point adder (FADD) implementations, that the normalized exponent to be off by 1 in the positive or negative. In these typical FMAC architectures, the exponent may be too large by 1 in the case where the leading bit anticipator (LBA) mispredicts the left shift amount necessary to normalize the mantissa. For cases where (C exp>AB exp), the addition of the AB mantissa to C mantissa may also create an overflow or underflow condition, requiring an addition of +1 or −1, respectively, to the exponent.

As shown in FIG. 2, the AB exponent 32A and C exponent 32B signals are received by the comparator circuitry 31. The AB exponent 32A and C exponent 32B signals are input into the multiplexer 33A. Multiplexer 33A utilizes the greater than exponent selector 33B to select which exponent 32A or 32B is greater and input into adders 34A through 34C. The multiplexer 33A outputs the larger exponent of AB exponent 32A and C exponent 32B by selection of the greater than exponent selector 33B.

The output of multiplexer 33A is input into three (3) parallel adders 34 (A–C). Also input into the (3) parallel adders 34 (A–C) are the exponent shift amount 33C signal and the mantissa underflow possible 33D signal. The mantissa underflow possible signal 33D is connected to both a primary input and the carry input of adder 34C. Depending on whether the mantissa has the possibility of underflowing or overflowing, the exponent is potentially adjusted by 0 or 2. By adjusting the constants 36A and 36B by 1, the effective range of exponents that can be compared against is exp−1, exp, exp+1. The correct case generated by adders 34 (A–C) is selected by multiplexer 35A using the adjust amount select 35B. The resulting exponent then feeds into comparator circuitry 38 (A–D).

Overflow constants 36A and underflow constants 36B are input to multiplexers 37A and 37B respectively. Precision select signals 37C and 37D, select which constants from precision overflow constants 36A and precision underflow constants 36B are output by multiplexers 37A and 37B. The selected precision constants feed into comparator circuitry 38 (A–D). Outputs from comparator circuitry 33A–33D are compare results 39A–39D respectively. These compare results are used by overflow/underflow logic circuitry to compute the final overflow/underflow signals.

A problem with the above described arrangement is that the serialized adder and compare operations consume a large amount of time, and may not be fast enough for high performance FMAC or FADD implementations. Attempting to improve the performance of the compare circuitry 31 through speculative compares can dramatically increase the number of required comparators.

Thus, a heretofore unaddressed need exists in the industry to create a high-performance overflow/underflow comparator while reducing the number of comparators in an overflow/underflow current, thereby minimizing the complexity of the overflow/underflow comparison circuitry, reducing power consumption, and the time required to determine whether an overflow/underflow condition exists.

SUMMARY OF THE INVENTION

The present invention provides an apparatus and method for sharing overflow/underflow compare hardware in a FADD or FMAC unit to reduce power consumption and circuit size requirements.

Briefly described, in architecture, the overflow/underflow compare hardware sharing apparatus can be implemented as follows. Overflow/underflow possible check circuitry determines if a mathematical operation involving a first exponent signal and a second exponent signal creates a potential overflow condition. The overflow/underflow possible check circuitry generates a signal indicating if the overflow condition is a possibility. Exponent compare circuitry computes an actual overflow/underflow condition if the signal indicates overflow is possible. The exponent compare circuitry computes an actual underflow condition if the signal does not indicate overflow is possible.

The present invention can also be viewed as providing a method for sharing overflow/underflow compare hardware to reduce power and circuits size requirements. In this regard, the method can be broadly summarized by the following steps: (1) receiving a first exponent signal and a second exponent signal; (2) determining if a mathematical operation involving the first exponent signal and the second exponent signal creates a potential overflow condition; (3) generating a signal indicating if the potential overflow condition exists; (4) computing an actual overflow condition if the signal indicates the potential overflow condition exists; and (5) computing an actual underflow condition if the signal indicates the potential overflow condition does not exist.

Other features and advantages of the present invention will become apparent to one with skill in the art upon examination of the following drawings and detailed description. It is intended that all such additional features and advantages be included herein within the scope of the present invention.

Figure 3A:
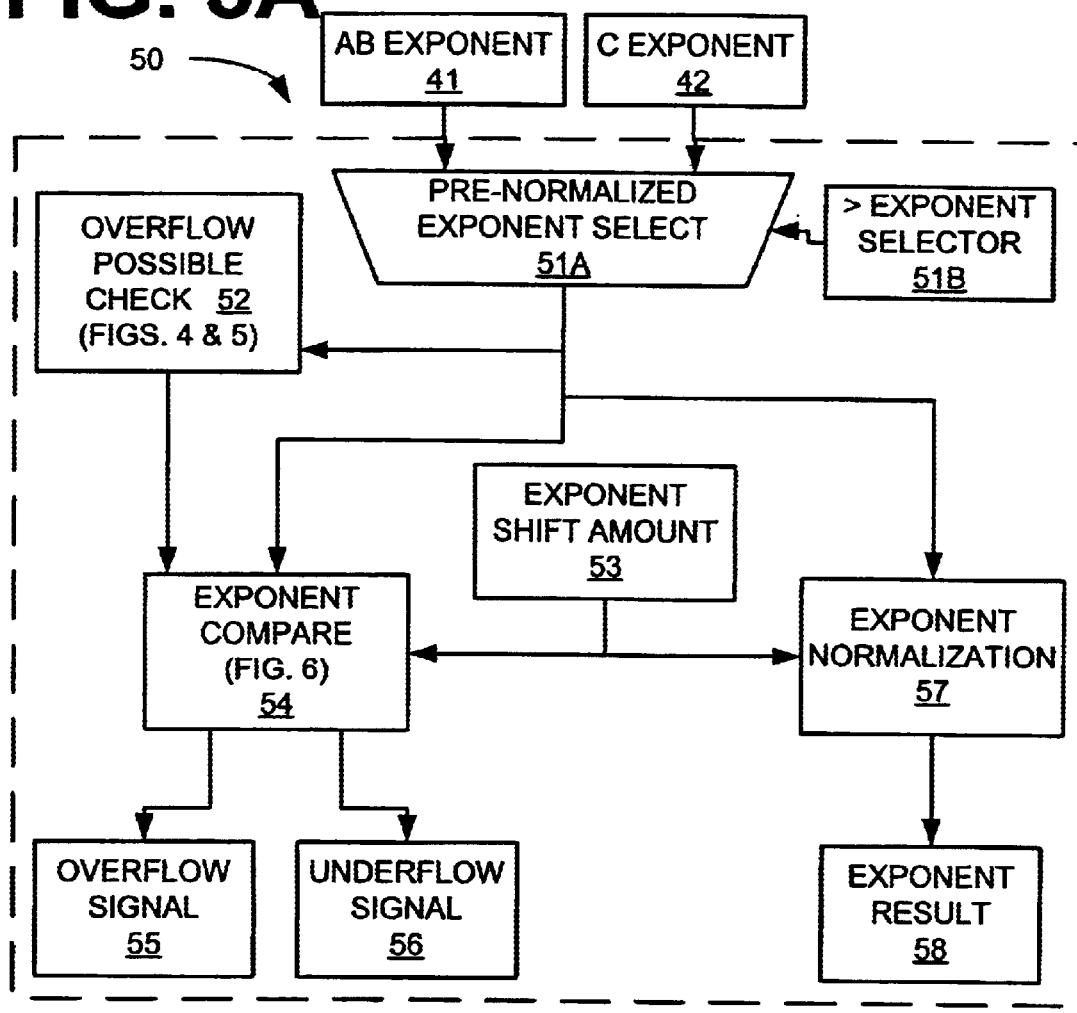
FIG. 3A is block diagram of an exponent normalization computation circuitry of the present invention.

Illustrated in FIG. 3C is a number line representing the possible range of the pre-normalized exponent output from the pre-normalized exponent select circuitry of the present invention, as shown in FIG. 3A, and the ranges for each precision where underflow or overflow are possible.

Illustrated in FIG. 3D is a truth table representing the value of the overflow possible signal for possible values of the pre-normalized exponent, used to derive the logic function in the overflow possible check circuitry of the present invention.

Figure 4A:
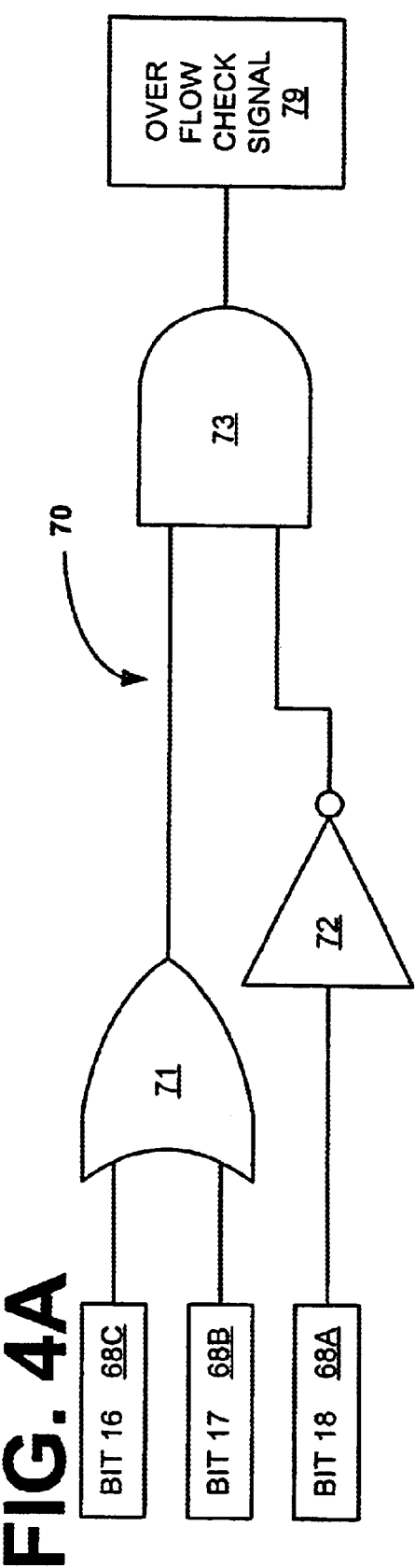

FIG. 4A is block diagram of an example of the overflow detection circuitry of the present invention, as shown in FIG. 3A.

Figure 4B:
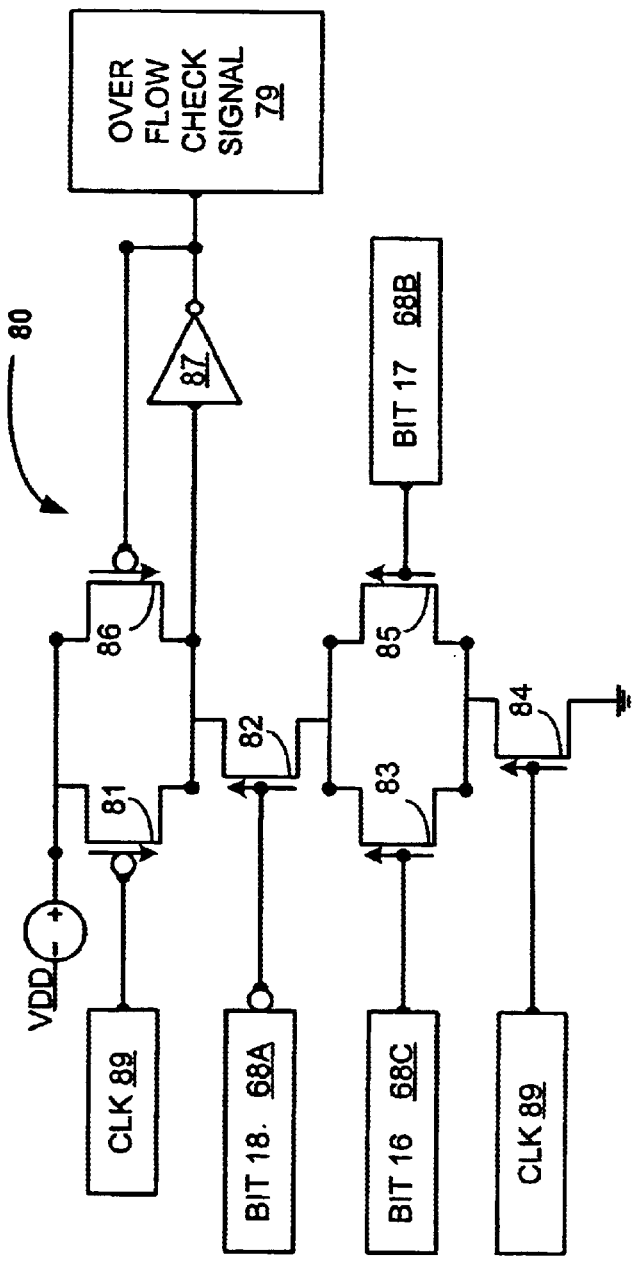

FIG. 4B is a schematic of a possible example of the overflow detection circuitry of the. present invention as shown in FIG. 4A.

FIG. 5A is block diagram of an example of the underflow detection circuitry of the present invention, as shown in FIG. 3A.

FIG. 5B is a schematic of a possible example of the underflow detection circuitry of the present invention as shown in FIG. 4A.

Figure 6:
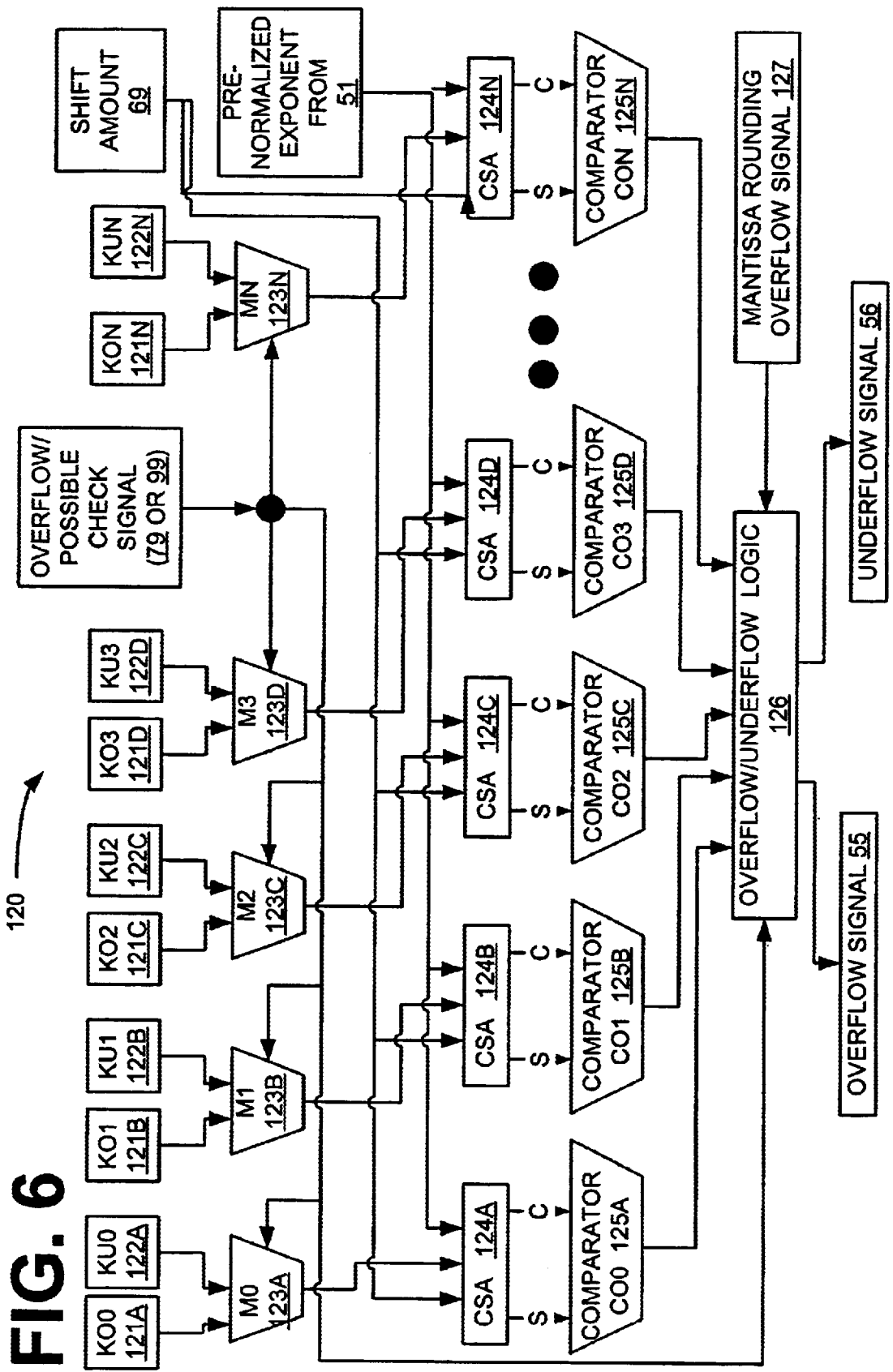

FIG. 6 is block diagram of an example of an exponent compare circuitry of the present invention, as shown in FIG. 3A.

Figure 8:
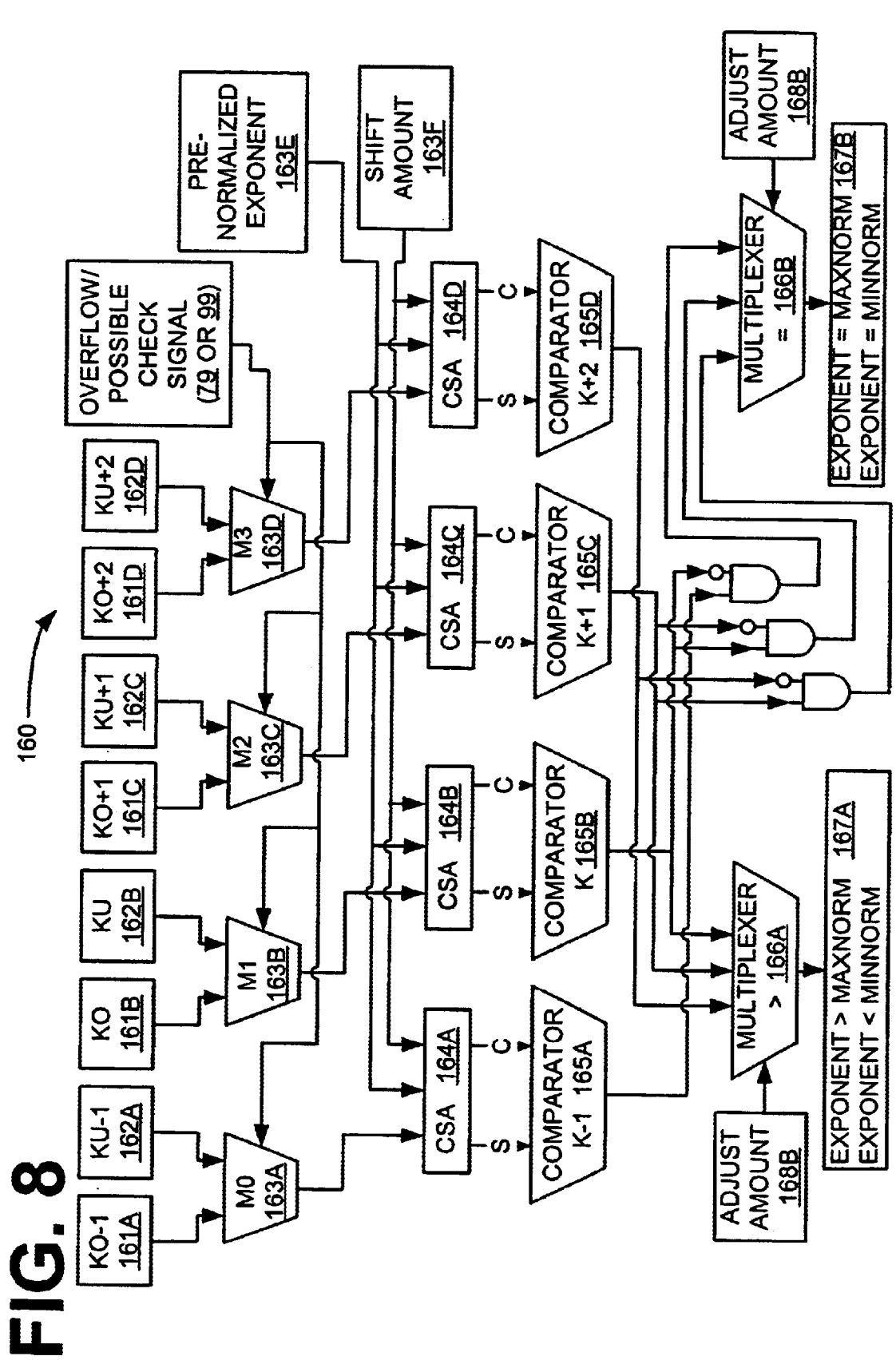

FIGS. 7A and 7B, are block diagrams of a second example of exponent compare circuitry 140 for the exponent compare circuitry 54 of the present invention, as shown in FIG. 3A FIG. 8 is block diagram of third example of an exponent compare circuitry of the present invention, as shown in FIG. 3A.

Figure 11:
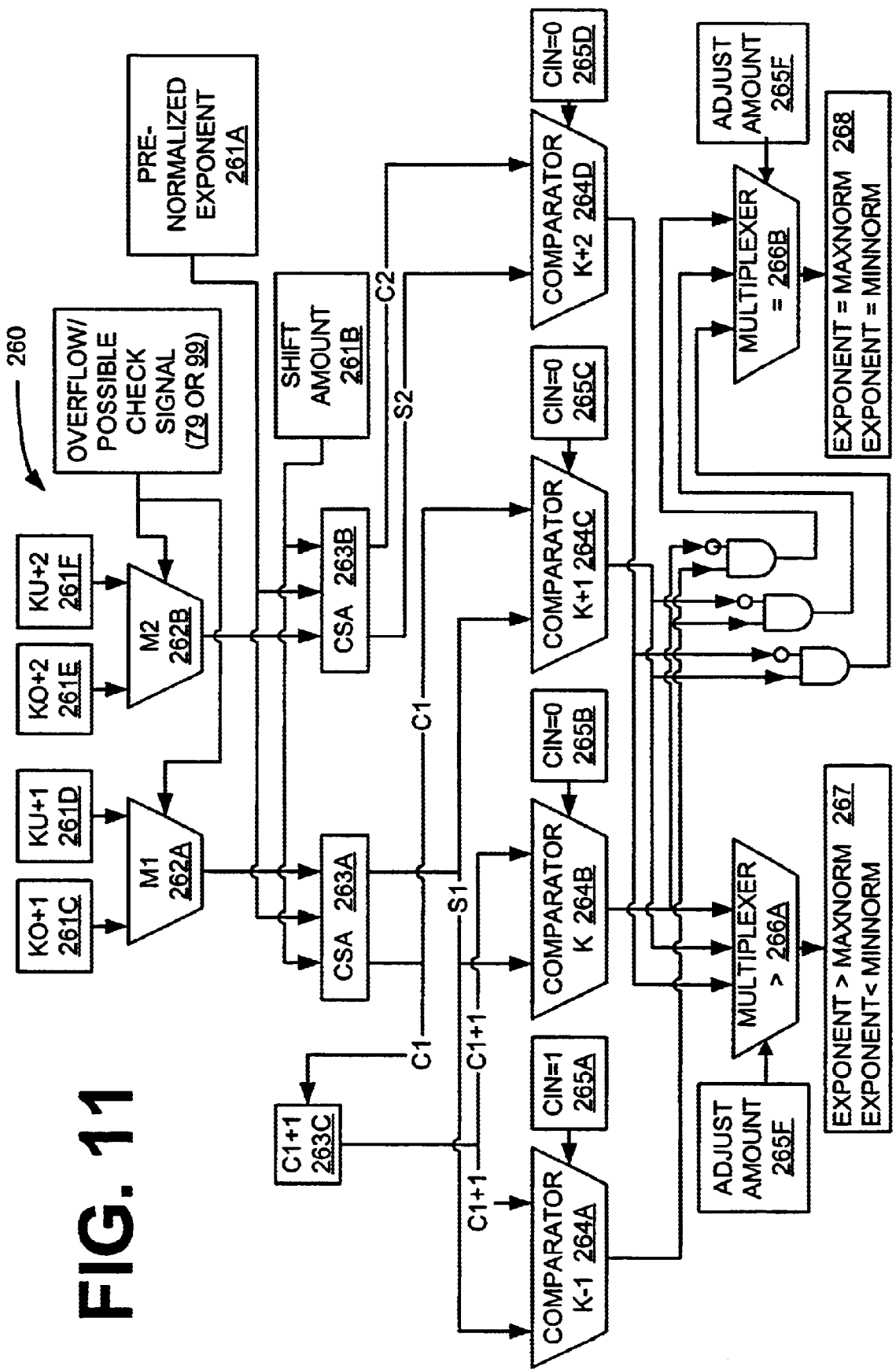

FIGS. 9A through 9D are block diagrams illustrating the precision overflow constant selection circuitry of the present invention, as shown in FIGS. 6, 8 and 11.

FIGS. 10A through 10D are block diagrams illustrating the precision underflow constant selection circuitry of the present invention, as shown in FIGS. 6, 8 and 11.

FIG. 11 is the preferred embodiment of an exponent compare circuitry of the present invention, as shown in FIG. 3A.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The first premise of the present invention is recognizing that overflow and underflow conditions do not happen at the same time. The application of this idea, that overflow and underflow conditions are mutually exclusive, makes it possible to predict which of the two conditions might occur in a given situation. By predicting which of the two conditions might occur, the overflow/underflow circuitry need only compute the final condition for one of the two conditions. Since the circuitry need only compute the final condition for one condition, it is possible to share the comparison circuitry, thereby minimizing overflow/underflow comparison circuitry and power consumption.

The second premise of the present invention is recognizing that it is possible to determine whether an underflow or overflow condition may occur, even before the exponent is normalized. This determination can be accomplished by examining the pre-normalized exponent. In this way, constants can be selected for comparison well ahead of the time they are needed. Without taking advantage of this fact, the implementation would be slower.

Illustrated in FIG. 3A is a block diagram of an example of an exponent normalization computation circuitry 50 of the present invention. As shown in FIG. 3A, the AB exponent 41 and C exponent 42 signals are received by the exponent normalization computation circuitry 50 of the present invention. The AB exponent 41 and C exponent 42 signals are input into the pre-normalized exponent selection circuitry 51A. The pre-normalized exponent selection circuitry 51A outputs the larger of exponent AB exponent 41 and C exponent 42 by selection of the greater exponent selector 51B. The larger exponent is input into overflow possible check circuitry 52 and the exponent normalization circuitry 57. The overflow possible check circuitry 52, is herein defined in further detail with regard to FIGS. 4 and 5. However, the overflow possible check circuitry 52 determines whether the mathematical operation involving AB exponent 41 and C exponent 42 may create an overflow condition.

If an overflow condition is possible, then an overflow possible check signal is set to true. Otherwise, the overflow possible check signal is set to false and thus indicates that an underflow condition is possible. The overflow possible check circuitry 52 sends the overflow possible check signal to the exponent compare circuitry 54 indicating which condition to check for (i.e., either overflow or underflow condition). The exponent compare circuitry 54 is herein defined in further detail with regard to FIGS. 6 through 11.

The exponent normalization circuitry 57 adds or subtracts a number from the pre-normalized exponent from the pre-normalized exponent selection circuitry 51. This addition or subtraction adjustment is necessary, when the mantissa of the floating-point result of the arithmetic operation is normalized. The exponent result signal 58 is output from the exponent normalization circuitry 57.

The exponent shift amount circuitry 53 determines to what degree the mantissa must be shifted to the left or right in order to normalize the pre-normalized exponent. This shift amount is added (for a right shift) or subtracted (for a left shift) from the pre-normalized exponent on the exponent normalization circuitry 57 in order to produce the exponent result 58.

The exponent compare circuitry 54 computes the actual final overflow/underflow condition. The input into the exponent compare circuitry 54 includes the signals from the overflow possible check circuitry 52, the exponent shift-amount circuitry 53 and a pre-normalized exponent from the pre-normalized exponent selection circuitry 51. The exponent compare circuitry 54 generates the overflow signal 55, and underflow signal 56. The exponent compare circuitry 54 is hereindefined in further detail with regard to FIG. 6.

Figure 3B:
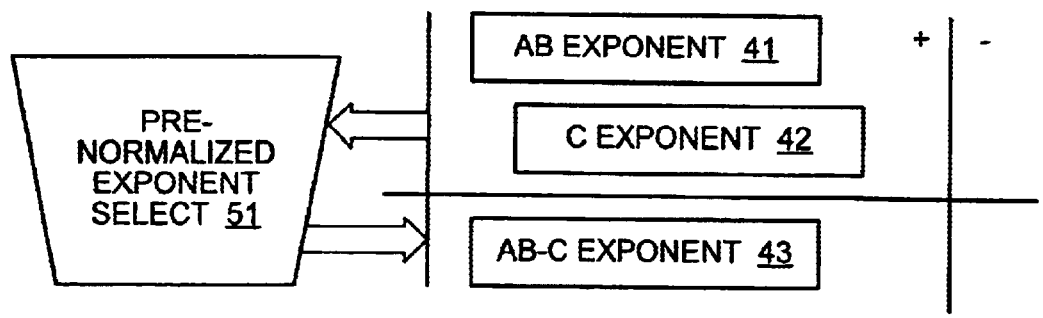
FIG. 3B is a block diagram representing an example of the pre-normalized exponent selection circuitry used to determine the largest exponent for the exponent normalization computation circuitry of the present invention, as shown in FIG. 3A.

Illustrated in FIG. 3B is a block diagram representing an example of the pre-normalized exponent selection circuitry 51. The pre-normalized exponent selection circuitry 51 is used to determine the largest exponent for the exponent normalization computation circuitry 50 of the present invention, as shown in FIG. 3A. As can be seen in the example, the AB exponent 41 and C exponent 42 are input into the pre-normalized exponent selection circuitry 51A. The pre-normalized exponent selection circuitry 51A determines which of the exponents is the larger, by selection of the greater exponent selector 51B. As shown in the example, the AB exponent 41 and C exponent 42 are both positive and the AB exponent 41 is the larger of the two exponents. Therefore, pre-normalized exponent selection circuitry 51 and the greater exponent selector 51B select the AB exponent 41 for the overflow possible check circuitry 52 and the exponent compare circuitry 54.

Illustrated in FIG. 3C is a number line representing the possible range of the pre-normalized exponent output 60 from the pre-normalized exponent select circuitry 51A of the present invention, as shown in FIG. 3A. In the example, three different types of precision are used. The "single precision overflow possible" range 61B, shows the range of pre-normalized exponents that could lead to an overflow in the result, when the result is rounded to single precision. Whether an overflow actually occurs, depends on the value of the exponent shift amount 53. If the pre-normalized exponent is less than the "single precision overflow possible" range 61B then there is no exponent shift amount 53 that will cause an overflow to occur. This range is also architecture and implementation dependent.

The "single precision underflow possible" range 61A shows the range of pre-normalized exponents that could lead to an underflow in the result, when the result is rounded to single precision. Whether an underflow actually occurs, depends on the value of the exponent shift amount 53. If the pre-normalized exponent is greater than the "single precision underflow possible" range 61A then there is no exponent shift amount 53 that will cause an underflow to occur. This range is also architecture and implementation dependent.

The "underflow possible" and "overflow possible" ranges are less restrictive on the double precision 62A and 62B and extended precision 63A and 63B ranges. The "worst case overflow/underflow possible" ranges 64A and 64B represent the widest possible ranges where an overflow or underflow is possible, and are equal to the "single-precision overflow/underflow possible" ranges in this example.

The possible threshold range 65 represents the range of exponents that does not overlap with the worst case underflow possible or overflow possible ranges, which is from FFFE (hex) to 1007C (hex) in the example illustrated. The possible threshold range 65 is used for comparison by overflow possible check circuitry 52 (FIG. 3A). The overflow possible check 52 can compare the pre-normalized exponent from the pre-normalized exponent select circuitry 51, against any value in this range to determine if the exponent compare logic 54 should be comparing for an overflow or underflow condition. A full comparator could be used on the overflow possible check 52 for this purpose. To save power, area, and time, an underflow/overflow threshold 67 is selected in the range FFFE to 1007C in the example illustrated, so a comparison may be performed with simpler logic. The selected underflow/overflow threshold 67 in the example illustrated, is hex value 10000.

Illustrated in FIG. 3D is a truth table 69 representing the value of the overflow possible signal for possible most significant bit values 18–16 (denoted by reference numerals 68A–68C, respectively) of the pre-normalized exponent. The most significant bit values 18–16 (68A–68C) are used to derive the logic function in the overflow possible check circuitry 52 of the present invention.

Illustrated in FIG. 4A is block diagram of an example of the overflow detection circuitry 70, in the overflow possible check circuitry 52 (FIG. 3A) of the present invention. As shown, the overflow detection circuitry 70 includes signals 68A–68C. These signals 68A–68C are representative of bits 18(sign)-16 (FIG. 3D). Signals 68C (bit 16) and 68B (bit 17) are input into the "OR" gate 71. The output of the "OR" gate 71 is one of the inputs into the "AND" gate 73. Signal 68A (bit 18 or sign bit S) is input into inverter gate 72 to provide the other input into the "AND" gate 73. The output of the "AND" gate 73 is the overflow possible check signal 79. The overflow check signal 79 is asserted to indicate when an overflow condition is possible.

Illustrated in FIG. 4B is a circuit schematic of a possible example of the overflow detection circuitry 80, as shown in FIG. 4A. Shown in FIG. 4B are signals 68C (bit 16) and 68B (bit 17), that are input into transistors 83 and 85, respectively, to represent "OR" gate 71 (FIG. 4A). This combination, in conjunction with signal 68A (bit 18) and transistor 82, represents the "OR" gate 72 and "AND" gate 73 in FIG. 4A. Clock signal 89 is utilized to drive the transistors at the appropriate time to produce overflow check signal 79. This schematic is just an example of one possible implementation of the overflow detection circuitry as shown in FIG. 4A and is for illustration purposes only.

Illustrated in FIG. 5A is block diagram of an example of the underflow detection circuitry 90 in the overflow possible check circuitry 52 (FIG. 3A) of the present invention. As shown, the underflow detection circuitry 90 includes signals 68A–68C. These signals 68A–68C are defined the same as the signals 68A–68C described above with regard to FIGS. 3D and 4A. The inverse values of signals 68C (bit 16) and 68B (bit 17) are input into "AND" gate 91. The output of "AND" gate 91 is one of the inputs into the "OR" gate 92. Signal 68A (bit 18 or sign) provides the other input into the "OR" gate 92. The output of the "OR" gate 92 is the underflow check signal 99. The check signal 99 is asserted to indicate when an underflow condition is possible.

Illustrated in FIG. 5B is a schematic of a possible example of the underflow detection circuitry 100, as shown in FIG. 5A. Shown in FIG. 5B are signals 68C (bit 16) and 68B (bit 17) that are input into transistors 102 and 103, respectively. This combination of transistors 102 and 103, are utilized to illustrate one possible example of the "NAND" gate 91 (FIG. 5A) implementation. Signal 68A (bit 18 or sign bit) is input into transistor 105, which is connected to both transistors 102 and 103. This combination of gates 102, 103 and 105 illustrate the functionality of "OR" gate 92 (FIG. 5A). The output of this combination produces the underflow check signal 99. Clock signal 109 is utilized to drive the transistors at the appropriate time to produce underflow check signal 99. This schematic is just an example of one possible implementation of the underflow detection circuitry as shown in FIG. 5A and is for illustration purposes only.

It is recognized that a designer of ordinary skill in the art could produce a gating cell or other circuit design to perform a similar function as those shown in FIGS. 4B and 5B, in order to implement the overflow/underflow detection circuitry of the present invention.

Illustrated in FIG. 6 is block diagram of an example exponent compare circuitry 120 for the exponent compare circuitry 54 of the present invention, as shown in FIG. 3A. As shown, input into the exponent compare circuitry 120 are signals from the overflow possible check circuitry 52, (i.e., signals 79 and 99), the exponent shift amount circuitry 53, and the pre-normalized exponent selection circuitry 51. An overflow possible check signal (79 or 99) is input from the overflow possible check circuitry 52. A shift amount 69 is input from the exponent shift amount circuitry 53. A pre-normalized exponent is input from the pre-normalized exponent select circuit 51.

The example of exponent compare circuitry 120 performs multiple simultaneous compares of the form EXPONENT+EXPONENT_ADJUST>(or<) CONSTANT (which can also be calculated as EXPONENT+EXPONENT_ADJUST−CONSTANT>(or<)Ø). The carry save adder 124X (CSA) followed by the comparator 125X together perform the above operation. Any sign adjustment needed in the CONSTANT is already taken into account in the input constants KOØ–KØN and KUØ–KUN. Each compare is performed on the full exponent word size, and compares the result exponent (EXPONENT+EXPONENT_ADJUST) against an overflow or underflow threshold, represented by a constant value.

The multiple comparisons are needed because the preferred embodiment requires comparisons against multiple overflow/underflow thresholds. Other implementations may have late arriving inputs, which could be dealt with by adding more parallel comparisons and choosing the correct result once the late arriving input is known. Other implementations may perform simultaneous compares for each possible result precision. The overflow/underflow logic 126 includes multiplexing logic to select the result of the correct comparator(s) and any additional logic that may be needed to produce the final overflow/underflow signals.

The overflow possible check signal (79 or 99) is loaded into each multiplexor 123 (A–N). Also loaded into multiplexors 123 (A–N) are a set of constants KO0–KON (121A–121N) and KU0–KUN (122A–122N), respectively. The overflow possible check signal (79 or 99) is used to signal which set of constants are to be transmitted through the multiplexor 123X. The output of multiplexors 123 (A–N) is input into respective carry save adders 124 (A–N).

Carry save adders 124 (A–N) also accept the shift amount 69 and the pre-normalized exponent from the pre-normalized exponent select 51 as input. The carry save adders 124 (A–N) each generate a sum and carry, which is input into comparators CO0–CON 125 (A–N), respectively. The comparators CO0–CON 125 (A–N) add together each sum and carry (shifted by 1 to the left) and produce a single output that is the sign of the operation EXPONENT+EXPONENT_ADJUST+K. This output shows the result of the comparison EXPONENT+EXPONENT_ADJUST>K, or EXPONENT+EXPONENT_ADJUST+(−K)>0 with a K determined by the output of a selected multiplexer 123A–123N.

The overflow/underflow logic 126 determines whether an overflow or underflow condition has occurred. The overflow/underflow logic 126 generates a high signal for the underflow signal 56 if overflow/underflow logic 126 determines that an underflow condition has occurred. The overflow/underflow logic 126 generates a low signal for the overflow signal 55 to indicate that an overflow condition has not occurred.

The overflow/underflow logic 126 generates a high signal for the overflow signal 55 if overflow/underflow logic 126 determines that an overflow condition has occurred. The overflow/underflow logic 126 generates a low signal for the underflow signal 56 to indicate that an underflow condition has not occurred.

It is recognized that a designer of ordinary skill in the art could produce other signal results to implement the overflow/underflow signals of the present invention. These include producing a low signal for the overflow signal 55 if overflow/underflow logic 126 determines that an overflow condition has occurred, and a high signal for the underflow signal 56 to indicate that an underflow condition has not occurred. As well as producing a low signal for the underflow signal 56 if overflow/underflow logic 126 determines that an underflow condition has occurred, and a high signal for the overflow signal 55 to indicate that an overflow condition has not occurred.

Illustrated in FIGS. 7A and 7B, are block diagrams of an example of exponent compare circuitry 140 of the present invention, as shown in FIG. 3A. In some FMAC and FADD implementations, two conditions for overflow (EXP_GT_MAXNORM and EXP_IS_MAXNORM) and two conditions for underflow (EXP_LT_MINNORM and EXP_IS_MINNORM) must be computed. These conditions must be computed because it is possible for the mantissa to overflow during the final rounding stage necessary to implement IEEE rounding. If the exponent is equal to the maximum normal exponent, a mantissa overflow, requiring an increment to the exponent, will create an overflow condition in the exponent. Likewise, an exponent that is 1 less than the minimum allowed normal exponent (flagged by the signal EXP_IS_MINNORM on this example implementation), which would normally indicate an exponent underflow condition, could become a non-underflowing exponent if the mantissa overflows.

Shown in FIG. 7A is the computation of 2 conditions for overflow and shown in FIG. 7B is the computation of 2 conditions for underflow. In FIG. 7A, inputs into the exponent overflow compare circuitry 140 are the pre-normalized exponent signal 141A, the exponent shift amount signal 141B, precision constant select 142A, and the mantissa underflow possible signal 142B. The exponent adjust amount 141B is input from the exponent shift amount circuitry 53 (FIG. 3A), and the pre-normalized exponent signal 161A is input from the pre-normalized exponent select circuit 51A (FIG. 3A).

Additional input signals include the precision overflow compare constants 141C and 141D, and adjustment constants zero 0 at reference numeral 141F and +2 at reference numeral 141E. The precision overflow compare constants 141C and precision compare constants-1 at reference numeral 141D, are each input into a 5:1 constant multiplexor 143A and 143B respectively. Precision select signal 142A indicates to multiplexors 143A and 143B respectively, the appropriate precision overflow constant to be selected and utilized in the compare logic. Precision overflow compare constants 141C include constant thresholds for the single precision, double precision, extended precision, widest range precision and single-instruction, multiple-data (SIMD) precision comparisons. The precision overflow compare constants −1 at reference numeral 141D, include constant thresholds−1 for the same precision thresholds in 141C. Mantissa underflow possible signal 142B indicates to multiplexor 143C, the appropriate adjustment constants to be selected and utilized in the compare logic.

The exponent shift amount 141B signal, and the pre-nornnalized exponent 141A signal, as well as the selected precision overflow constants from multiplexors 143A and 143B, are input into the carry save adders 144A through 144F. The sum and carry output of the carry save adders 144A through 144F, are input into three greater than comparators 145A–145C, and three equality comparators 145D–145F. The results from comparators 145A–145C and comparators 145D–145F are input into that greater than multiplexer 146A and equality multiplexer 146B respectively. Adjust amount 142C indicates which of the results reflect the proper condition of the exponent for the two conditions for overflow (EXP_GT_MAXNORM and EXP_IS_MAXNORM).

Shown in FIG. 7B, is a equivalent circuit of FIG. 7A that produces the EXP_LT_MINNORM and EXP_IS_MINNORM signals, used in the computation of the underflow signal.

In FIG. 7B, inputs into the exponent underflow compare circuitry 140 are the pre-normalized exponent signal 151A, the exponent shift amount signal 151B, precision constant select 152A, and the mantissa underflow possible signal 152B. The exponent adjust amount 151B is input from the exponent shift amount circuitry 53 (FIG. 3A), and the pre-normalized exponent signal 151A is input from the pre-normalized exponent select circuit 51A (FIG. 3A).

Additional input signals include the precision underflow compare constants 151C and 151D, and adjustment constants zero 0 denoted by reference numeral 151F and +2 denoted by reference numeral 151E. The precision underflow compare constants 151C and precision compare constants-1 151D are each input into a 5:1 constant multiplexor 153A and 153B respectively. Precision select signal 152A indicates to multiplexors 153A and 153B respectively, the appropriate precision underflow constant to be selected and utilized in the compare logic. Precision underflow compare constants 151C include constant thresholds for the single precision, double precision, extended precision, widest range precision and SIMD precision comparisons. The precision underflow compare constants-1 151D, include constant thresholds −1 for the same precision thresholds in 151C. Mantissa underflow possible signal 142B indicates to multiplexor 153C, the appropriate adjustment constants to be selected and utilized in the compare logic.

The exponent shift amount 151B signal, and the pre-normalized exponent 151A signal, as well as the selected precision overflow constants from multiplexors 153A and 153B, are input into the carry save adders 154A through 154F. The sum and carry output of the carry save adders 154A through 154F, are input into three less than comparators 155A–155C, and three equality comparators 155D–155F. The results from comparators 155A–155C and comparators 155D–155F are input into that less than multiplexer 156A and equality multiplexer 156B respectively. Adjust amount 152C indicates which of the results reflect the proper condition of the exponent for the two conditions for underflow (EXP_LT_MINNORM and EXP_IS_MINNORM).

Figure 1A:
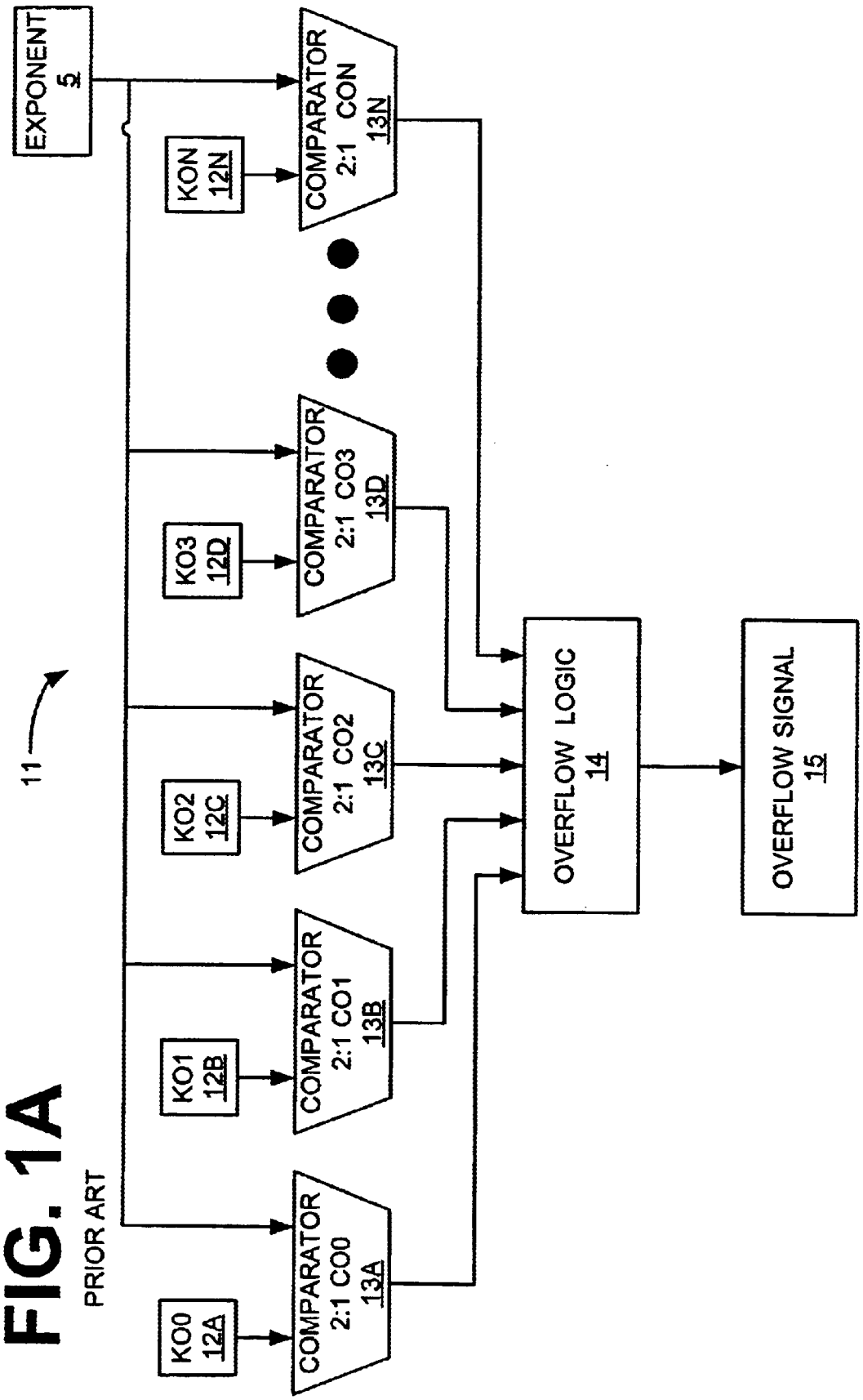
FIG. 1A is a block diagram representing an example of a prior art independent overflow circuitry.
Figure 1B:
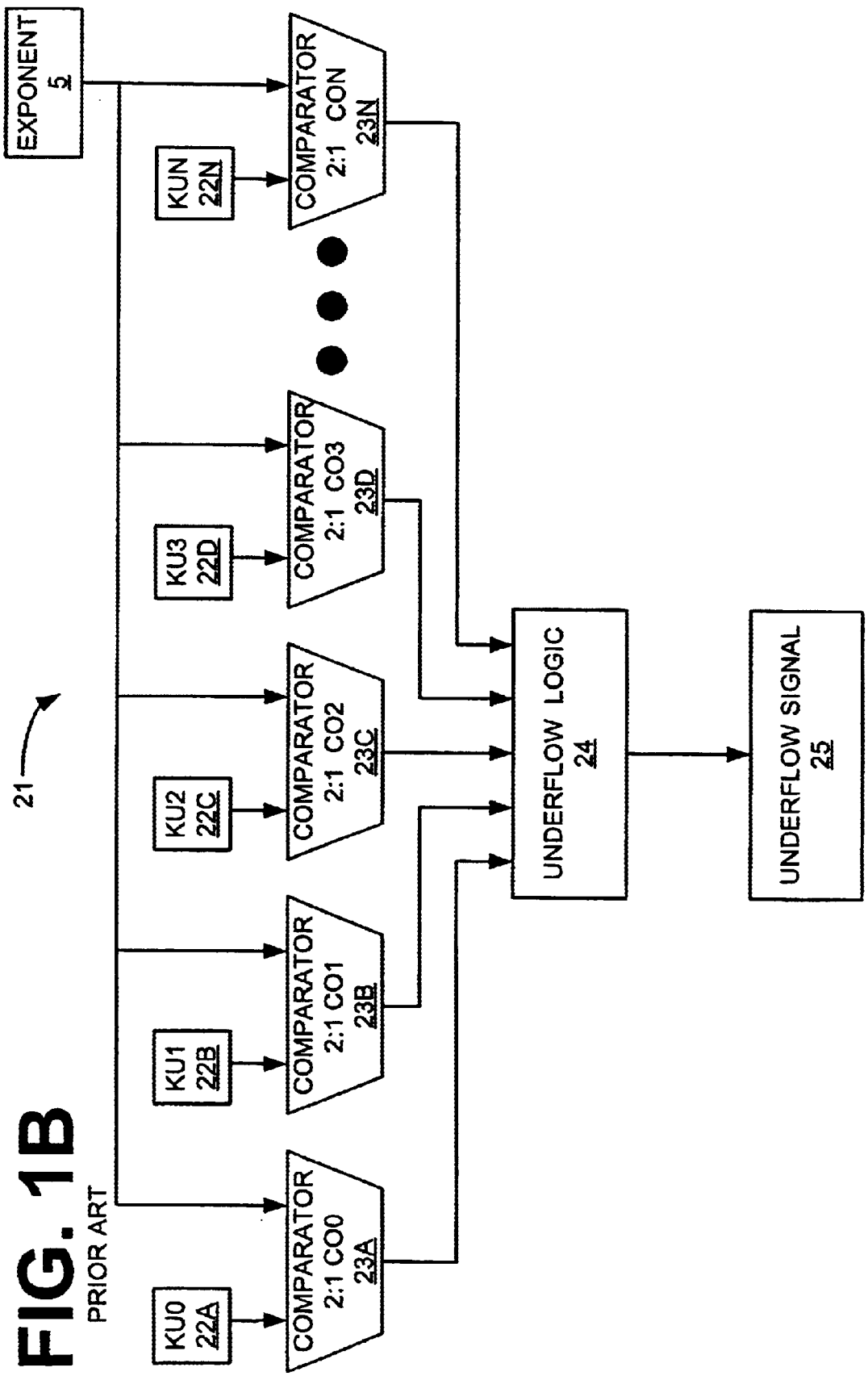
FIG. 1B is a block diagram representing an example of a prior art independent underflow circuitry.
Figure 2:
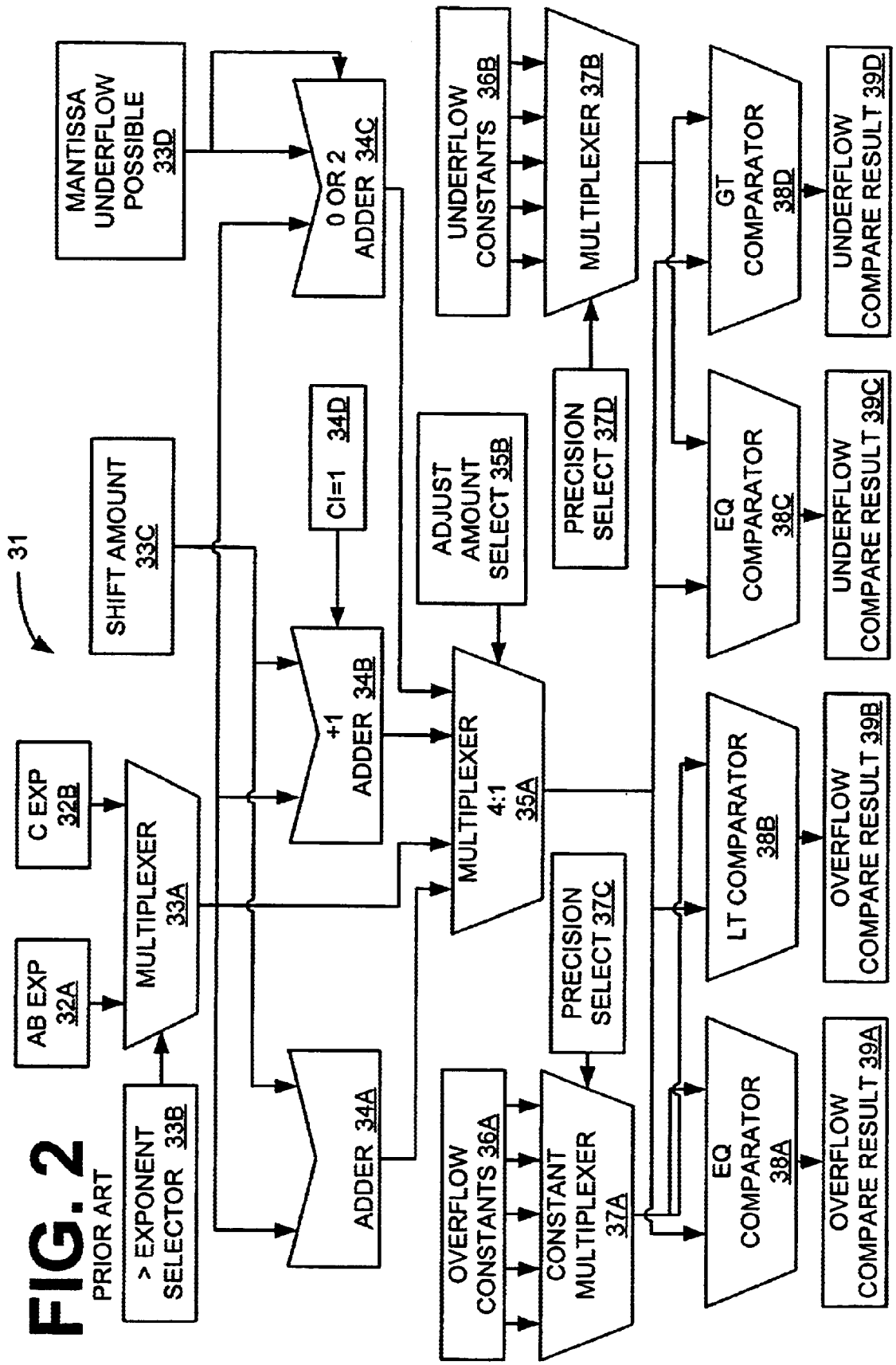
FIG. 2 is a block diagram representing an example of a prior art comparator circuitry.

FIGS. 7A and 7B illustrate a speed improvement over the comparator of the prior art (FIG. 2), since an adder delay is replaced by a CSA delay. FIGS. 7A and 7B also illustrate the problem of the increased number of comparators required by speculative compares. The two overflow compare results (EXP_GT_MAXNORM and EXP_IS_MAXNORM) or the two underflow compare results (EXP_LT_MINNORM and EXP_IS_MINNORM), feed overflow logic 126 (FIG. 6).

Illustrated in FIG. 8 is block diagram of example of exponent compare circuitry 160 of the present invention, as shown in FIG. 3A. The exponent compare circuitry 160 represents a major improvement over exponent compare circuitry 140 (FIGS. 7A and 7B). The improvement is that the 6 equally comparators 145D–145F and 155D–155F and 6 less/greater than comparators 145A–145C and 155A–155C in the exponent compare circuitry 140 (FIGS. 7A and 7B), are replaced by just 4 comparators 165A–165D in the exponent compare circuitry 160. The equality conditions can be computed by logically examining the results of compares against two consecutive constants. If the exponent is adjusted by 1 less or 1 more, then the desired output compare signals are produced by using input constants 1 less or 1 more respectively. Compares are performed in parallel against constants over a range large enough to accommodate the range by which the exponents may change (in this case −1 to +1). The overflow possible check signal 79 or 99 is used to cut the overall compare circuitry by half.

As shown in FIG. 8, input into the exponent compare circuitry 160 are signals from the overflow possible check signals 79 and 99, the exponent shift amount signal 163F, and the pre-normalized exponent signal 163E. The overflow possible check signal (79 or 99) is input from the overflow possible check circuitry 52 (FIG. 3A), the exponent adjust amount 163F is input from the exponent shift amount circuitry 53 (FIG. 3A), and the pre-normalized exponent signal 163E is input from the pre-normalized exponent select circuit 51 (FIG. 3A).

The overflow possible check signal (79 or 99) is loaded into each multiplexor 163A–163D. Also loaded into multiplexors 163A–163D are a set of constants KO−1 to KO+2 (denoted by respective reference numerals 161A–161D, respectively and KU−1 to KU+2 (162A–162D), respectively. The overflow possible check signal (79 or 99) is used to identify which set of constants are to be transmitted through the multiplexors 163A–163D. The output of multiplexors 163A–163D is input into respective carry save adders 164A–164D.

Carry save adders 164A–164D also accept the exponent shift amount 163F and the pre-normalized exponent signal 163E as input. The four carry save adders 164A–164D each generate a sum and carry, which is input into four comparators 165A–165D, respectively. The comparators 165A–165D add together each sum and carry (shifted by 1 to the left) and produce a single output. This single output is used to compute one of the two conditions for overflow (EXP_GT_MAXNORM and EXP_IS_MAXNORM) or one of the two conditions for underflow (EXP_LT_MINNORM and EXP_IS_MINNORM). The output of comparators 165 (A–D) are input into the multiplexers the 166A and 166B. The output of multiplexers 166A and 166B indicates one of the two conditions for overflow (EXP_GT_MAXNORM and EXP_IS_MAXNORM) or one of the two conditions for underflow (EXP_LT_MINNORM and EXP_IS_MINNORM). The two compare results (EXP_GT_MAXNORM/EXP_LT_MINNORM) 167A and (EXP_IS_MAXNORM/EXP_IS_MINNORM) 167B feed overflow/underflow logic 126 (FIG. 6).

Illustrated in FIGS. 9A–9D are block diagrams illustrating the precision overflow constant selection circuitry of the present invention, as shown in FIGS. 6, 8 and 11. Shown in FIGS. 9A–9D are examples of five different types of precision constants utilized in the example exponent compare circuitry 54 of the present invention, as shown in FIG. 3A. Precision compare constants cover the range of the constant value (−1) 161A, the constant value 161B, the constant value (+1) 161C and the constant value (+2) 161D. This range is applied to the single, double, extended, widest range and SIMD precision overflow constants. Also shown are the precision multiplexers 186, 196, 206 and 216 for selecting the appropriate overflow precision constant based upon multiplexer precision select inputs (not shown). The overflow constant output signals are 161A–161D as indicated.

Illustrated in FIGS. 10A–10D are block diagrams illustrating the precision underflow constant selection circuitry of the present invention, as shown in FIGS. 6, 8 and 11. Shown in FIG. 10A are examples of five different types of precision underflow constants, utilized in the example exponent compare circuitry 54 (FIG. 3A) of the present invention. Precision underflow compare constants cover the range from the constant value (−1) 162A, the constant value 162B, the constant value (+1) 162C and the constant value (+2) 162D. This range is applied to the single, double, extended, widest range and SIMD precision constants. Also shown are the precision multiplexers for selecting the appropriate underflow precision constant based upon multiplexer precision select inputs (not shown). The underflow constant output signals are 162A–162D as indicated.

Illustrated in FIG. 11 is block diagram of the preferred embodiment of an exponent compare circuitry 260 of the present invention, as shown in FIG. 3A. FIG. 11 makes a significant improvement over the circuitry in FIG. 8. The 4 sets of constant selects 263A–263D, 4 CSA's 264A–264D, and 4 comparators 264A–265D (FIG. 8) are replaced by 2 sets of constant select multiplexers 262A and 262B and CSA's 263A and 263B (FIG. 11). The constant being compared to in each multiplexer 262A and 262B, can be adjusted by up to 2 in the negative. A carry into the comparator 264A–264D will effectively adjust the constant by 1 in the negative. Another adjust by 1 in the negative can be achieved by inserting a 1 on the least significant bit (LSB) of the shifted carry result from the CSA 263C.

By combining the adjusting effects of these two values, the effective constant for comparing against can cover a range of 3 values. By using (K+1) into the CSA, the effective range of constants we compare to is K−1, K, and K+1. Since K+2 is also required, a second CSA 263B and constant select logic is needed.

As shown, input into the exponent compare circuitry 260 are signals from the overflow possible check signals 79 and 99, the exponent shift amount signal 261B, and the pre-normalized exponent signal 261A. The overflow possible check signal (79 or 99) is input from the overflow possible check circuitry 52 (FIG. 3), the exponent adjust amount 261B is input from the exponent shift amount circuitry 53 (FIG. 3), and the pre-normalized exponent signal 261A is input from the pre-normalized exponent select circuit 51 (FIG. 3).

The overflow possible check signal (79 or 99) is loaded into each multiplexor 262A and 262B. Also loaded into multiplexors 262A and 262B is a first set of constants (KO+1) 261C and (KU+1) 261D, and a second set of constants (KO+2) 261E and (KU+2) 261F, respectively. The overflow possible check signal (79 or 99) is used to indicate which set of constants are to be transmitted through the multiplexor 262A and 262B. The output of multiplexors 262A and 262B is input into respective carry save adders 263A and 263B.

Carry save adders 263A and 263B also accept the exponent shift amount 261B and the pre-normalized exponent signal 261A as input. The two carry save adders 263A and 263B, each generate a sum and carry, which is input into four comparators 264A–264D, respectively. The comparators 264A–264D add together each sum and carry (shifted by 1 to the left) and produce a single output that is used to compute one of the two conditions for overflow (EXP_GT_MAXNORM and EXP_IS_MAXNORM) or one of the two conditions for underflow (EXP_LT_MINNORM and EXP_IS_MINNORM). The output of comparators 265 (A–D) are input into the multiplexers the 266A and 266B. The output of multiplexers 266A and 266B indicates one of the two conditions for overflow (EXP_GT_MAXNORM and EXP_IS_MAXNORM) or one of the two conditions for underflow (EXP_LT_MINNORM and EXP_IS_MINNORM). The two compare results (EXP_GT_MAXNORM/EXP_LT_MINNORM and EXP_IS_MAXNORM/EXP_IS_MINNORM) feed overflow/underflow logic as depicted in 126 of FIG. 6.

The block diagrams of FIGS. 3A and 3B–11, show the architecture, functionality, and operation of a possible implementation of the system architecture to share overflow/underflow compare hardware to reduce power and circuits size requirements. In this regard, each block represents a module, device, or logic. It should also be noted that in some alternative implementations, are considered possible to perform the desired functions.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. An exponent compare apparatus for computing overflow and underflow conditions, the apparatus comprising:

a plurality of constant selectors, wherein each of said plurality of constant selectors selects an exponent precision underflow/overflow constant from a plurality of exponent underflow/overflow constants;

a plurality of carry save adders, wherein each of said plurality of carry save adders generates a sum signal and carry signal from one of said plurality of exponent precision underflow/overflow constants, a pre-normalized exponent signal and a normalization shift amount signal;

a plurality of comparators, wherein each of said comparators is configured to compute an underflow/overflow result from said sum signal and said carry signal; and a plurality of underflow/overflow result selectors, wherein each of said underflow/overflow result selector is configured to transmit an underflow/overflow condition based upon said underflow/overflow result, from said plurality of comparators, and an exponent adjust amount signal.

2. The apparatus of claim 1, wherein said plurality of constant selectors further comprises two constant selectors.

3. The apparatus of claim 1, wherein said plurality of carry save adders further comprises two carry save adders.

4. The apparatus of claim 1, wherein said plurality of comparators further comprises four comparators and wherein a first one of said four comparators uses a least significant bit input of said carry signal from one of said plurality of carry save adders and a carry-in signal to extend the range of said constants being compared.

5. The apparatus of claim 1, wherein said condition indicates whether said result is an overflow result, said apparatus further comprising logic configured to compute a first exponent value based upon said underflow/overflow result if said condition indicates that said underflow/overflow result is an overflow result, said logic further configured to compute a second exponent value if said condition indicates that said underflow/overflow result is an underflow result.

6. An exponent compare apparatus for computing overflow and underflow conditions, the apparatus comprising:

means for selecting an exponent precision underflow/overflow constant from a plurality of exponent underflow/overflow constants;

means for generating a sum signal and carry signal from one of said plurality of exponent precision underflow/overflow constants, a pre-normalized exponent signal and a normalization shift amount signal;

means for computing an underflow/overflow result from said sum signal and said carry signal; and means for transmitting an underflow/overflow condition based upon said underflow/overflow result, received from said computing means, and an exponent adjust amount signal.

7. The apparatus of claim 6, wherein said means for selecting further comprises two constant selectors.

8. The apparatus of claim 6, wherein said generating means further comprises two carry save adders.

9. The apparatus of claim 6, wherein said computing means further comprises four comparators, wherein a first one of said four comparators uses a least significant bit input of said carry signal from one of said plurality of carry save adders and a carry-in signal to extend the range of said constants being compared.

* * * * *